(12) United States Patent
Tourapis et al.

(10) Patent No.: US 7,280,700 B2
(45) Date of Patent: Oct. 9, 2007

(54) OPTIMIZATION TECHNIQUES FOR DATA COMPRESSION

(75) Inventors: Alexandros Tourapis, West Windsor, NJ (US); Shipeng Li, Irvine, CA (US); Feng Wu, Beijing (CN); Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/462,085

(22) Filed: Jun. 13, 2003

(65) Prior Publication Data

US 2004/0008899 A1    Jan. 15, 2004

Related U.S. Application Data

(60) Provisional application No. 60/393,894, filed on Jul. 5, 2002.

(51) Int. Cl.
G06K 9/46 (2006.01)
H04B 1/66 (2006.01)

(52) U.S. Cl. .................................................. 382/238

(58) Field of Classification Search ................ 382/232, 382/233, 238, 250, 251; 358/426.11, 433; 375/240.12, 240.16, 240.18, 240.26, 240.29
See application file for complete search history.

(56) References Cited

U.S. PATENT DOCUMENTS

| 4,454,546 A | 6/1984 | Mori |
|---|---|---|
| 4,661,849 A | 4/1987 | Hinman |
| 4,661,853 A | 4/1987 | Roeder et al. |
| 4,695,882 A | 9/1987 | Wada et al. |
| 4,796,087 A | 1/1989 | Guichard et al. |
| 4,849,812 A | 7/1989 | Borgers et al. |
| 4,862,267 A | 8/1989 | Gillard et al. |
| 4,864,393 A | 9/1989 | Harradine et al. |
| 5,021,879 A | 6/1991 | Vogel |
| 5,068,724 A | 11/1991 | Krause et al. |

(Continued)

FOREIGN PATENT DOCUMENTS

EP    0 397 402    11/1990

(Continued)

OTHER PUBLICATIONS

U.S. Appl. No. 60/341,674, filed Dec. 17, 2001, Lee et al.

(Continued)

*Primary Examiner*—Amir Alavi
(74) *Attorney, Agent, or Firm*—Klarquist Sparkman, LLP

(57) ABSTRACT

Methods and apparatuses are provided relating to the encoding of data, such as, e.g., images, video, etc. For example, certain methods include processing at least a portion of data using a plurality of different quantization functions to produce a plurality of corresponding quantized portions of data, and selectively outputting one of the quantized portions of data based on at least one threshold value. The method may also include dividing initial data into a plurality of portions and classifying the portion of data based on at least one classification characteristic. Here, for example, there may be a threshold value that is associated with the classification characteristic. Additional syntax may be adopted to enable considerably higher compression efficiency by allowing several alternative motion prediction cases. A high efficiency time stamp independent Direct Mode is also provided which considers spatial motion vector prediction as well with stationary temporal predictors.

32 Claims, 10 Drawing Sheets

U.S. PATENT DOCUMENTS

| | | |
|---|---|---|
| 5,089,887 A | 2/1992 | Robert et al. |
| 5,089,889 A | 2/1992 | Sugiyama |
| 5,091,782 A | 2/1992 | Krause et al. |
| 5,103,306 A | 4/1992 | Weiman et al. |
| 5,117,287 A | 5/1992 | Koike et al. |
| 5,132,792 A | 7/1992 | Yonemitsu et al. |
| 5,157,490 A | 10/1992 | Kawai et al. |
| 5,175,618 A | 12/1992 | Ueda |
| 5,223,949 A | 6/1993 | Honjo |
| 5,235,618 A | 8/1993 | Sakai et al. |
| 5,260,782 A | 11/1993 | Hui |
| 5,298,991 A | 3/1994 | Yagasaki et al. |
| 5,400,075 A | 3/1995 | Savatier |
| 5,412,430 A | 5/1995 | Nagata |
| RE34,965 E | 6/1995 | Sugiyama |
| 5,424,779 A | 6/1995 | Odaka |
| 5,428,396 A | 6/1995 | Yagasaki |
| 5,442,400 A | 8/1995 | Sun |
| 5,448,297 A | 9/1995 | Alattar et al. |
| 5,461,421 A | 10/1995 | Moon |
| RE35,093 E | 11/1995 | Wang et al. |
| 5,467,086 A | 11/1995 | Jeong |
| 5,467,134 A | 11/1995 | Laney et al. |
| 5,467,136 A | 11/1995 | Odaka |
| 5,477,272 A | 12/1995 | Zhang et al. |
| RE35,158 E | 2/1996 | Sugiyama |
| 5,510,840 A | 4/1996 | Yonemitsu et al. |
| 5,539,466 A | 7/1996 | Igarashi et al. |
| 5,565,922 A | 10/1996 | Krause |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,623,311 A | 4/1997 | Phillips et al. |
| 5,666,461 A | 9/1997 | Igarashi et al. |
| 5,699,476 A | 12/1997 | Van Der Meer |
| 5,701,164 A | 12/1997 | Kato |
| 5,724,453 A | 3/1998 | Ratnakar et al. |
| 5,734,755 A | 3/1998 | Ramchandran et al. |
| 5,786,860 A | 7/1998 | Kim et al. |
| 5,787,203 A | 7/1998 | Lee et al. |
| 5,796,438 A | 8/1998 | Hosono |
| RE35,910 E | 9/1998 | Nagata et al. |
| 5,822,541 A | 10/1998 | Nonomura et al. |
| 5,835,144 A | 11/1998 | Matsumura et al. |
| 5,844,613 A | 12/1998 | Chaddha |
| 5,847,776 A | 12/1998 | Khmelnitsky |
| 5,874,995 A | 2/1999 | Naimpally et al. |
| 5,901,248 A | 5/1999 | Fandrianto et al. |
| 5,929,940 A | 7/1999 | Jeannin |
| 5,946,042 A | 8/1999 | Kato |
| 5,949,489 A | 9/1999 | Nishikawa et al. |
| 5,959,673 A | 9/1999 | Lee et al. |
| 5,963,258 A | 10/1999 | Nishikawa et al. |
| 5,963,673 A | 10/1999 | Kodama et al. |
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,982,438 A | 11/1999 | Lin et al. |
| 5,990,960 A | 11/1999 | Murakami et al. |
| 5,991,447 A | 11/1999 | Eifrig et al. |
| 6,002,439 A | 12/1999 | Murakami et al. |
| 6,005,980 A | 12/1999 | Eifrig et al. |
| RE36,507 E | 1/2000 | Iu |
| 6,011,596 A | 2/2000 | Burl |
| 6,026,195 A | 2/2000 | Eifrig et al. |
| 6,040,863 A * | 3/2000 | Kato ............ 375/240.16 |
| 6,055,012 A | 4/2000 | Haskell et al. |
| 6,067,322 A | 5/2000 | Wang |
| 6,094,225 A | 7/2000 | Han |
| RE36,822 E | 8/2000 | Sugiyama |
| 6,097,759 A | 8/2000 | Murakami et al. |
| 6,125,147 A | 9/2000 | Florencio et al. |
| 6,130,963 A | 10/2000 | Uz et al. |
| 6,154,495 A | 11/2000 | Yamaguchi et al. |
| 6,175,592 B1 * | 1/2001 | Kim et al. ............ 375/240.16 |
| 6,188,725 B1 | 2/2001 | Sugiyama |
| 6,188,794 B1 | 2/2001 | Nishikawa et al. |
| 6,192,081 B1 | 2/2001 | Chiang et al. |
| 6,201,927 B1 | 3/2001 | Comer |
| 6,205,176 B1 | 3/2001 | Sugiyama |
| RE37,222 E | 6/2001 | Yonemitsu et al. |
| 6,243,418 B1 | 6/2001 | Kim |
| 6,263,024 B1 | 7/2001 | Matsumoto |
| 6,271,885 B2 | 8/2001 | Sugiyama |
| 6,282,243 B1 | 8/2001 | Kazui et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,320,593 B1 | 11/2001 | Sobel et al. |
| 6,324,216 B1 | 11/2001 | Igarashi et al. |
| 6,377,628 B1 | 4/2002 | Schultz et al. |
| 6,381,279 B1 | 4/2002 | Taubman |
| 6,404,813 B1 | 6/2002 | Haskell et al. |
| 6,496,601 B1 | 12/2002 | Migdal et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,614,442 B1 | 9/2003 | Ouyang et al. |
| 6,636,565 B1 | 10/2003 | Kim |
| 6,647,061 B1 | 11/2003 | Panusopone et al. |
| 6,650,781 B2 | 11/2003 | Nakaya |
| 6,654,419 B1 | 11/2003 | Sriram et al. |
| 6,683,987 B1 | 1/2004 | Sugahara |
| 6,704,360 B2 | 3/2004 | Haskell et al. |
| 6,728,317 B1 | 4/2004 | Demos |
| 6,735,345 B2 | 5/2004 | Lin et al. |
| 6,785,331 B1 | 8/2004 | Jozawa et al. |
| 6,873,657 B2 * | 3/2005 | Yang et al. ............ 375/240.16 |
| 6,876,703 B2 | 4/2005 | Ismaeil et al. |
| 6,920,175 B2 | 7/2005 | Karczewicz et al. |
| 6,975,680 B2 | 12/2005 | Demos |
| 6,999,513 B2 * | 2/2006 | Sohn et al. ............ 375/240.16 |
| 7,003,035 B2 | 2/2006 | Tourapis et al. |
| 7,054,494 B2 | 5/2006 | Lin et al. |
| 7,154,952 B2 * | 12/2006 | Tourapis et al. ....... 375/240.16 |
| 2001/0040926 A1 | 11/2001 | Hannuksela et al. |
| 2002/0012394 A1 | 1/2002 | Hatano et al. |
| 2002/0114388 A1 | 8/2002 | Ueda |
| 2002/0154693 A1 | 10/2002 | Demos |
| 2002/0168066 A1 | 11/2002 | Li |
| 2002/0186890 A1 | 12/2002 | Lee et al. |
| 2003/0099292 A1 | 5/2003 | Wang et al. |
| 2003/0112864 A1 | 6/2003 | Karczewicz et al. |
| 2003/0113026 A1 | 6/2003 | Srinivasan et al. |
| 2003/0142748 A1 | 7/2003 | Tourapis |
| 2003/0142751 A1 | 7/2003 | Hannuksela |
| 2003/0156646 A1 | 8/2003 | Hsu et al. |
| 2004/0001546 A1 | 1/2004 | Tourapis et al. |
| 2004/0047418 A1 | 3/2004 | Tourapis et al. |
| 2004/0136457 A1 | 7/2004 | Funnell et al. |
| 2004/0141651 A1 | 7/2004 | Hara et al. |
| 2004/0146109 A1 | 7/2004 | Kondo et al. |
| 2005/0013497 A1 | 1/2005 | Hsu et al. |
| 2005/0013498 A1 | 1/2005 | Srinivasan |
| 2005/0036759 A1 | 2/2005 | Lin et al. |
| 2005/0100093 A1 | 5/2005 | Holcomb |
| 2005/0129120 A1 | 6/2005 | Jeon |
| 2005/0135484 A1 | 6/2005 | Lee |
| 2005/0147167 A1 | 7/2005 | Dumitras et al. |
| 2005/0254584 A1 | 11/2005 | Kim et al. |
| 2006/0013307 A1 | 1/2006 | Olivier et al. |

| | | | |
|---|---|---|---|
| 2006/0072662 | A1 | 4/2006 | Tourapis et al. |
| 2006/0280253 | A1* | 12/2006 | Tourapis et al. ....... 375/240.16 |
| 2007/0064801 | A1 | 3/2007 | Wang et al. |

FOREIGN PATENT DOCUMENTS

| | | |
|---|---|---|
| EP | 0 526 163 | 2/1993 |
| EP | 0 535 746 | 4/1993 |
| EP | 0 540 350 | 5/1993 |
| EP | 555 016 A2 | 8/1993 |
| EP | 0 588 653 | 3/1994 |
| EP | 0 614 318 | 9/1994 |
| EP | 0 625 853 | 11/1994 |
| EP | 0 771 114 | 5/1997 |
| EP | 0 782 343 | 7/1997 |
| EP | 0 786 907 | 7/1997 |
| EP | 0 830 029 | 3/1998 |
| EP | 0 279 053 | 8/1998 |
| EP | 0 863 673 A1 | 9/1998 |
| EP | 0 863 674 | 9/1998 |
| EP | 0 863 675 | 9/1998 |
| EP | 0 884 912 | 12/1998 |
| EP | EP 0 944 245 | 9/1999 |
| EP | 0 959 628 A2 | 11/1999 |
| EP | 1 006 732 | 7/2000 |
| GB | 2328337 | 2/1999 |
| GB | 2343579 | 5/2000 |
| JP | 61205086 | 9/1986 |
| JP | 62 213 494 | 9/1987 |
| JP | 3-001688 | 1/1991 |
| JP | 3 129 986 | 3/1991 |
| JP | 6 078 298 | 3/1994 |
| JP | 6-078295 | 3/1994 |
| JP | 06-276481 | 9/1994 |
| JP | 06-276511 | 9/1994 |
| JP | 6-292188 | 10/1994 |
| JP | 7-274171 | 10/1995 |
| JP | 08-140099 | 5/1996 |
| JP | 09-322163 | 12/1997 |
| JP | 10056644 | 2/1998 |
| JP | 11 136683 | 5/1999 |
| RU | 2182727 C2 | 5/2002 |
| WO | WO 00/33581 | 8/2000 |
| WO | WO 01/11893 | 2/2001 |
| WO | WO 01/56298 A1 | 8/2001 |
| WO | WO 03/026296 | 3/2003 |
| WO | WO 2005/004491 | 1/2005 |

OTHER PUBLICATIONS

U.S. Appl. No. 60/488,710, filed Jul. 18, 2003, Srinivasan et al.
Anonymous, "DivX Multi Standard Video Encoder," 2 pp.
Ericsson, "Fixed and Adaptive Predictors for Hybrid Predictive/Transform Coding," IEEE Transactions on Comm., vol. COM-33, No. 12, pp. 1291-1302 (1985).
Flierl et al., "Multihypothesis Motion Estimation for Video Coding," Proc. DCC, 10 pp. (Mar. 2001).
Fogg, "Survey of Software and Hardware VLC Architectures," SPIE, vol. 2186, pp. 29-37 (1994).
Girod, "Efficiency Analysis of Multihypothesis Motion-Compensated Prediction for Video Coding," IEEE Transactions on Image Processing, vol. 9, No. 2, pp. 173-183 (Feb. 2000).
Horn et al., "Estimation of Motion Vector Fields for Multiscale Motion Compensation," Proc. Picture Coding Symp. (PCS 97), pp. 141-144 (Sep. 1997).
Hsu et al., "A Low Bit-Rate Video Codec Based on Two-Dimensional Mesh Motion Compensation with Adaptive Interpolation," IEEE Transactions on Circuits and Systems for Video Technology, vol. 11, No. 1, pp. 111-117 (Jan. 2001).
ISO/IEC, "MPEG-4 Video Verification Model Version 18.0," ISO/IEC JTC1/SC29/WG11 N3908, Pisa, pp. 1-10, 299-311 (Jan. 2001).
ISO/IEC, "ISO/IEC 11172-2: Information Technology—Coding of Moving Pictures and Associated Audio for Storage Mediaat up to About 1.5 Mbit/s," 122 pp. (1993).
ISO/IEC, "Information Technology—Coding of Audio-Visual Objects: Visual, ISO/IEC 14496-2, Committee Draft," 330 pp. (1998).
ISO/IEC, "MPEG-4 Video Verification Model Version 10.0," ISO/IEC JTC1/SC29/WG11, MPEG98/N1992, 306 pp. (1998).
ITU—Q15-F-24, "MVC Video Codec—Proposal for H.26L," Study Group 16, Video Coding Experts Group (Question 15), 28 pp. (document marked as generated in 1998).
ITU-T, "ITU-T Recommendation H.261: Video Codec for Audio-visual Services at p x 64 kbits," 28 pp. (1993).
ITU-T, "ITU-T Recommendation H.262: Information Technology—Generic Coding of Moving Pictures and Associated Audio Information: Video," 218 pp. (1995).
ITU-T, "ITU-T Recommendation H.263: Video Coding for Low Bit Rate Communication," 167 pp. (1998).
Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).
Konrad et al., "On Motion Modeling and Estimation for Very Low Bit Rate Video Coding," Visual Comm. & Image Processing (VCIP '95), 12 pp. (May 1995).
Microsoft Corporation, "Microsoft Debuts New Windows Media Players 9 Series, Redefining Digital Media on the PC," 4 pp. (Sep. 4, 2002) [Downloaded from the World Wide Web on May 14, 2004].
Mook, "Next-Gen Windows Media Player Leaks to the Web," BetaNews, 17 pp. (Jul. 19, 2002) [Downloaded from the World Wide Web on Aug. 8, 2003].
Printouts of FTP directories from http://ftp3.itu.ch, 8 pp. (downloaded from the World Wide Web on Sep. 20, 2005).
Reader, "History of MPEG Video Compression—Ver. 4.0," 99 pp. (document marked Dec. 16, 2003).
Sullivan et al., "The H.264/AVC Advanced Video Coding Standard: Overview and Introduction to the Fidelity Range Extensions," 21 pp. (Aug. 2004).
"The TML Project WEB-Page and Archive," (including pages of code marked "image.cpp for H.26L decoder, Copyright 1999" and "image.c"), 24 pp.
Wang et al., "Interlace Coding Tools for H.26L Video Coding," ITU-T SG16/Q.6 VCEG-O37, pp. 1-20 (Dec. 2001).
Wien, "Variable Block-Size Transforms for Hybrid Video Coding," Dissertation, 182 pp. (Feb. 2004).
Wu et al., "Joint estimation of forward and backward motion vectors for interpolative prediction of video," IEEE Transactions on Image Processing, vol. 3, No. 5, pp. 684-687 (Sep. 1994).
Yu et al., "Two-Dimensional Motion Vector Coding for Low Bitrate Videophone Applications," Proc. Int'l Conf. on Image Processing, Los Alamitos, US, pp. 414-417, IEEE Comp. Soc. Press (1995).
Reusens, et al. "Dynamic Approach to Visual Data Compression", IEEE Transactions on Circuits and Systems for Video Technology, IEEE Inc., Feb. 1, 1997, pp. 197-210, vol. 7, No. 1, New York, US.
Marcellin, et al, "An overview of quantization in JPEG 2000", Signal Processing: Image Communication, Elsevier Science Publishers, Jan. 2002, pp. 73-84, vol. 17, No. 1, Amsterdam NL.
Text of Committee Draft of Joint Video Specification (ITU-T Rec. H-264 ISO/IEC 14496-10 AVC) MPEG02/N4810, May 2002 pp. I-X, 1, Fairfax, US.
International Organisation for Standardisation, Coded Representation of Picture and Audio Information, Test Model 5; Telecommunication Standardization Sector, Study Group 15; Document AVC-491b, Version 2, Apr. 1993; pp. 1-119.
Tran, Trac Duy, "A Locally Adaptive Perceptual Masking Threshold Model for Image Coding," Dept. of Electrical Engineering and Computer Science, Massachusetts Institute of Technology, May 1994, pp. 1-97.
Joint Video Team of ISO/IEC MPEG and ITU-T VCEG, "Joint Final Committee Draft (JFCD) of Joint Video Specification (ITU-T Recommendation H.264, ISO/IEC 14496-10 AVC," JVT-D157 (Aug. 2002).
Joint Video Team (JVT) of ISO/IEC MPEG and ITU-T VCEG, "Study of Final Committee Draft of Joint Video Specification," JVT-F100, Awaji Island, 242 pp. (Dec. 2002).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Panusopone et al., "Direct Prediction for Predictive (P) Picture in Field Coding mode," Joint Video Team (JVT) of ISO/IEC MPEG & ITU-T VCEG, Document JVT-D046, 8 pp. (Jul. 2002).

Tourapis et al., "Direct Prediction for Predictive (P) and Bidirectionally Predictive (B) frames in Video Coding," Joint Video Team (JVT) of ISO/IEC MPEG & ITU-T VCEG (ISO/IEC JTC1/SC29/WG11 and ITU-T SG16 Q.6), Document JVT-C128, 11 pp. (May 2002).

Tourapis et al., "Motion Vector Prediction in Bidirectionally Predictive (B) frames with regards to Direct Mode," Joint Video Team (JVT) of ISO/IEC MPEG & ITU-T VCEG (ISO/IEC JTC1/SC29/WG11 and ITU-T SG16 Q.6), Document JVT-C127, 7 pp. (May 2002).

Tourapis et al., "Timestamp Independent Motion Vector Prediction for P and B frames with Divisional Elimination," Joint Video Team (JVT) of ISO/IEC MPEG & ITU-T VCEG (ISO/IEC JTC1/SC29/WG11 and ITU-T SG16 Q.6), Document JVT-D040, 18 pp. (Jul. 2002).

Tourapis et al., "Performance Comparison of Temporal and Spatial Direct mode," Joint Video Team (JVT) of ISO/IEC MPEG & ITU-T VCEG (ISO/IEC JTC1/SC29/WG11 and ITU-T SG16 Q.6), Document JVT-E026, 7 pp. (Oct. 2002).

Wiegand et al., "Long-term Memory Motion Compensated Prediciton," IEEE Transactions on Circuits & Systems for Video Technology, vol. 9, No. 1, pp. 70-84 (Feb. 1999).

U.S. Appl. No. 60/501,081, filed Sep. 7, 2003, Srinivasan et al.

Chalidabhongse et al., "Fast motion vector estimation using multiresolution spatio-temporal correlations," IEEE Transactions on Circuits and Systems for Video Technology, pp. 477-488 (Jun. 1997).

Schwarz et al., "Tree-structured macroblock partition," ITU-T SG16/Q.6 VCEG-017, 6 pp. (Dec. 2001).

Schwarz et al., "Core Experiment Results On Improved Macroblock Prediction Modes," Joint Video Team (JVT) of ISO/IEC MPEG & ITU-T VCEG (ISO/IEC JTC1/SC29/WG11 and ITU-T SG16 Q.6), Document JVT-B054, 10 pp. (Jan.-Feb. 2002).

Wiegand et al., "Motion-compensating Long-term Memory Prediciton," Proc. Int'l Conf. on Image Processing, 4 pp. (Oct. 1997).

Wiegand et al., "Motion-compensating Long-term Memory Prediction," Proc. Int'l Conf. on Image Processing, 4 pp. (Oct. 1997).

\* cited by examiner

800

| picture_layer_rbsp( ) { | Category | Descriptor |
|---|---|---|
| picture_structure | 3 | e( v ) |
| frame_num | 3 | u( v ) |
| rps_layer( ) | | |
| if( coding_type( ) = = Inter ) { | | |
| copy_mv_spatial | | u(n) or e(v) |
| } | | |
| if( coding_type( ) = = Bipred ) { | | |
| direct_mv_spatial | | u(n) or e(v) |
| if( direct_mv_spatial) { | | |
| direct_mv_scale_fwd | 3 | e( v ) |
| direct_mv_scale_bwd | 3 | e( v ) |
| direct_mv_scale_divisor | 3 | e( v ) |
| } | | |
| explicit_B_prediction_block_weight_indication | | e( v ) |
| if ( explicit_B_prediction_block_weight_indication > 1 ) | | |
| adaptive_B_prediction_coeff_table( ) | | |
| } | | |
| rbsp_trailing_bits( ) | | |
| } | | |

Fig. 8

OPTIMIZATION TECHNIQUES FOR DATA COMPRESSION

RELATED PATENT APPLICATIONS

This U.S. Patent Application claims the benefit of priority from, and hereby incorporates by reference the entire disclosure of, U.S. Provisional Patent Application Ser. No. 60/393,894, filed Jul. 5, 2002, and titled "Rate/Distortion Optimization Techniques for Image and Video Compression".

TECHNICAL FIELD

The present invention relates generally to computers and like devices, and more particularly to methods, apparatuses and systems for compressing/encoding data and decompressing/decoding data.

BACKGROUND

There is a continuing need for improved methods and apparatuses for compressing/encoding data and decompressing/decoding data, and in particular image and video data. Improvements in coding efficiency allow for more information to be processed, transmitted and/or stored more easily by computers and other like devices. With the increasing popularity of the Internet and other like computer networks, and wireless communication systems, there is a desire to provide highly efficient coding techniques to make full use of available resources.

Rate Distortion Optimization (RDO) techniques are quite popular in video and image encoding/decoding systems since they can considerably improve encoding efficiency compared to more conventional encoding methods.

Additional information, for example, may be found in a Master of Science in Computer Science and Engineering thesis titled "A Locally Adaptive Perceptual Masking Threshold Model for Image Coding", by Trac Duy Tran while at the Massachusetts Institute of Technology, May 1994.

As there is a continuing desire to provide even more encoding efficiency, there is a need for improved methods and apparatuses that further increase the performance of RDO or other like techniques to achieve improved coding efficiency versus existing systems.

SUMMARY

The present invention provides improved methods and apparatuses that can be used in compressing/encoding, decompressing/decoding data, and/or otherwise processing various forms of data including, but not limited to image, video and/or audio data.

The above-stated needs and others are met, for example, by a method that includes processing at least a portion of data using a plurality of different quantization functions to produce a plurality of corresponding quantized portions of data, and selectively outputting one of the quantized portions of data based on at least one threshold value. The method may also include dividing initial data into a plurality of portions and classifying the portion of data based on at least one classification characteristic. Here, for example, there may be a threshold value that is associated with the classification characteristic.

By way of example, the initial data may include image data, video data, audio data, speech data, and the like. The portion that is selected may take the form of a block, a macroblock, a slit, a slice, a section, or the like. The classification characteristic(s) may include an edge characteristic, a texture characteristic, a smoothness characteristic, a luminance characteristic, a chrominance characteristic, a color characteristic, a noise characteristic, an object characteristic, a motion characteristic, a user preference characteristic, a user interface focus characteristic, a layering characteristic, a timing characteristic, a volume characteristic, a frequency characteristic, a pitch characteristic, a tone characteristic, a quality characteristic, a bit rate characteristic, a data type characteristic, a resolution characteristic, an encryption characteristic, or the like.

In certain exemplary implementations, the plurality of different quantization functions includes at least two operatively different Deadzone Quantizers. Here, for example, a Deadzone Quantizer may be an adaptive coverage Deadzone Quantizer, a variable coverage size Deadzone Quantizer, or the like. The method may also include encoding the quantized portions. The method may further include performing Rate Distortion Optimization (RDO) to select the quantized portions of data.

In accordance with still other exemplary implementations, another method includes performing at least one characteristic analysis on at least one portion of image data, selectively setting at least one adaptive quantization parameter within an encoder based on the characteristic analysis, and encoding the portion of image data with the encoder.

In yet another exemplary implementation, a method is provided that includes causing at least one portion of image data to be encoded using at least two different Deadzone Quantizers, and identifying preferred encoded data in an output of one of the at least two different Deadzone Quantizers based on a Rate Distortion Optimization (RDO) decision associated with at least one decision factor.

The above stated needs and others are also satisfied by a method that includes causing at least one portion of image data to be encoded using a first Deadzone Quantizer, determining if an output of the first Deadzone Quantizer satisfies at least one decision factor and if so, then outputting the output of the first Deadzone Quantizer. If not, then causing the portion of image data to be encoded using at least a second Deadzone Quantizer that is different from the first Deadzone Quantizer. Here, for example, the method may also include identifying an acceptable encoded version of the portion of the image data based on an RDO decision or other like.

In still another exemplary implementation, a method includes performing image analysis on at least one portion of image data, performing block classification on the analyzed portion of image data, performing Deadzone Quantization of the block classified portion of image data, and performing encoding of the Deadzone Quantized portion of image data. Here, for example, the image analysis may include edge detection analysis, texture analysis, etc.

In accordance with a further exemplary implementation a method is provided that includes causing at least one portion of video image data to be encoded using at least two different encoders wherein at least one of the two different encoders includes a Deadzone Quantizer operatively configured to support a Non Residual Mode of the video image data, and identifying preferred encoded frame data in an output of one of the two different encoders based on a Rate Distortion Optimization (RDO) decision associated with at least one decision factor.

Another exemplary method includes selectively varying at least one Lagrangian multiplier that is operatively configuring encoding logic having a quantizing function based on at least one characteristic of at least one portion of image data, and encoding the portion of the image data using the encoding logic.

In still another implementation, an exemplary method includes encoding at least a portion of video image data using encoder logic, and causing the encoder logic to output syntax information identifying a type of motion vector prediction employed by the encoder logic.

A method for use in conveying video encoding related information includes encoding video data, and selectively setting at least one descriptor within a syntax portion of the encoded video data, the descriptor identifying an adaptive spatial/spatio-temporal encoding associated with at least one B frame encoded with the video data. Another method for use in conveying video encoding related information includes encoding video data, and selectively setting at least one descriptor within a syntax portion of the encoded video data, the descriptor identifying an adaptive copy/motion-copy skip mode in at least one inter frame encoded with the video data.

An exemplary method for use in a time stamp independent mode encoding of video considering stationary temporal/spatial portions of video frames is provided. Here, for example, the method includes selectively applying spatial prediction of motion associated with at least one portion of a video frame in a video sequence, and, if temporal motion prediction information for a reference portion of another video frame is zero, then setting the spatial prediction of motion to zero.

BRIEF DESCRIPTION OF THE DRAWINGS

A more complete understanding of the various methods, apparatuses and systems of the present invention may be had by reference to the following detailed description when taken in conjunction with the accompanying drawings wherein:

FIG. 8 is a chart listing exemplary syntax information for use with logic for selectively applying different prediction methods for motion vector, in accordance with certain implementations of the present invention.

DESCRIPTION

Figure 1:
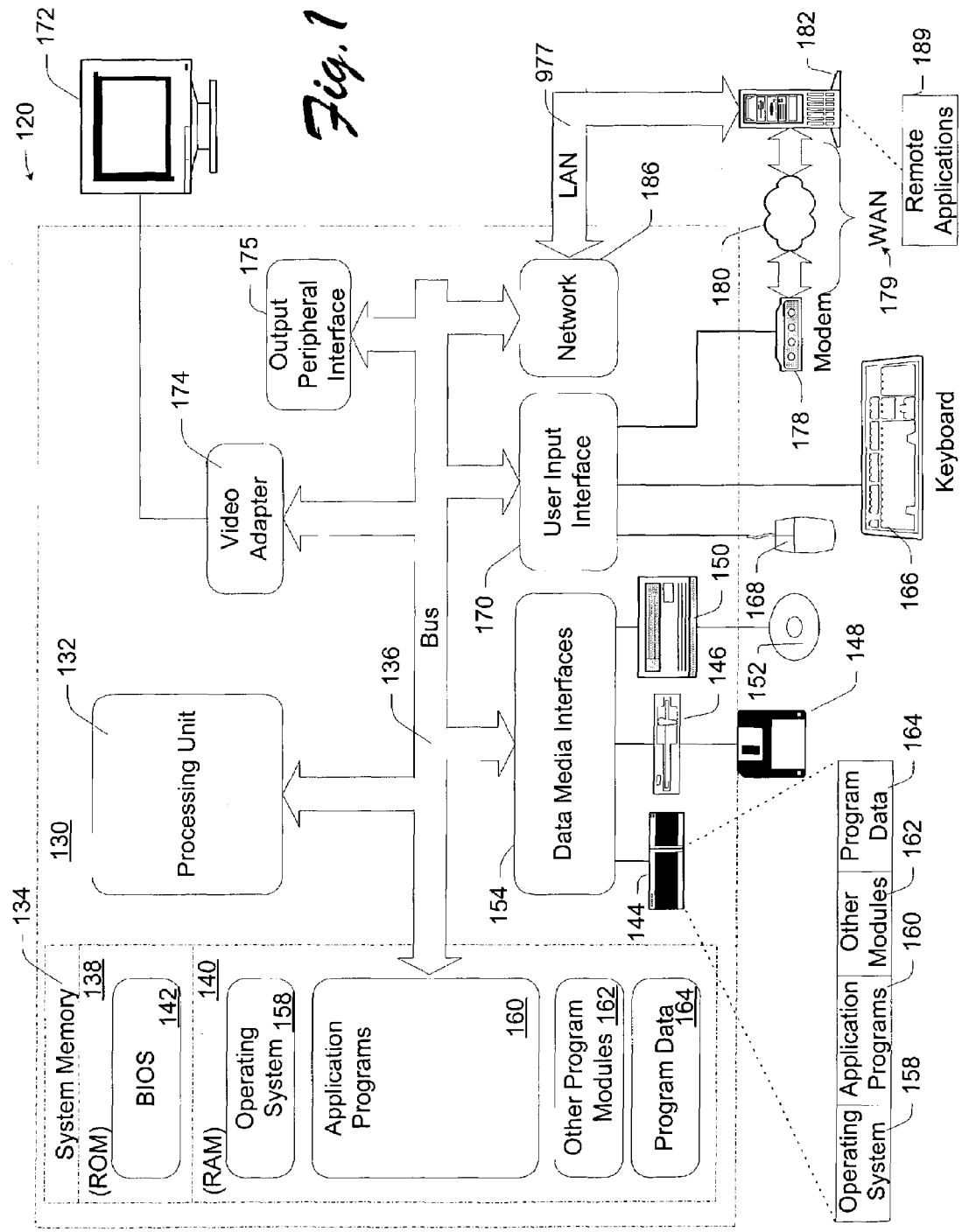
FIG. 1 is a block diagram that depicts an exemplary device, in the form of a computer, which is suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a server computer, which may take the form of a personal computer, a workstation, a dedicated server, a plurality of processors, a mainframe computer, etc. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Exemplary Computing Environment:

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Improved Rate/Distortion Optimization Techniques:

Although the following sections describe certain exemplary methods and apparatuses that are configured to initially compress/encode and decompress/decode image data and/or video data, those skilled in the art of data compression will recognize that the techniques presented can be adapted and employed to compress/encode and decompress/decode other types of data. For example, certain methods and apparatuses may be adapted for use in compressing/encoding audio data, speech data and the like.

Furthermore, although the exemplary methods and apparatuses can be configured in logic within a computer, those skilled in the art will recognize that such methods and apparatuses may be implemented in other types of devices, appliances, etc. The term "logic" as used herein is meant to include hardware, firmware, software, or any combination thereof, and any other supporting hardware or other mechanisms as may be required to fulfill the desired functions, either fully or partially.

With this in mind, several exemplary schemes are presented that can be implemented in some form of logic to support the processing of data.

In accordance with certain aspects of the present invention, several novel techniques are presented for improving the performance of video and/or image encoding/decoding systems. In some exemplary implementations, these techniques are employed for use with image/video coding standards such as JPEG and JVT (Joint Video Team) Standard (e.g., H.264/AVC). By way of example, for the case of JVT, syntax changes are presented that can operatively enable an adaptive selection of different prediction types that can be used for predicting certain parameters of the video, such as, e.g., motion information.

Rate Distortion Optimization (RDO) techniques are quite popular in video and image encoding/decoding systems since they can considerably improve encoding efficiency compared to more conventional encoding methods. There is a continuing desire to provide even more encoding efficiency. This description describes methods and apparatuses that can significantly improve the performance of RDO or other like techniques to achieve improved coding efficiency versus existing systems.

In accordance with certain further aspects of the present invention, one may also further combine and improve RDO or other like techniques with image pre-analysis concepts, such as, for example, edge and/or texture detection, by using adaptive and/or variable size Deadzone quantizers depending on the characteristics of the image or macroblock.

This description also introduces/defines some additional exemplary syntax changes that can be implemented to enable a combination of different prediction schemes at a frame level, for example, thus further improving the performance of video coding schemes. By way of example, one technique arises from the fact that for some frames or portions of a sequence, motion may be more correlated in a temporal domain than in a spatial domain, or vice versa. This could be exploited by performing a pre-analysis of the frame, but also through encoding the same frame using two or possibly more different methods and selecting a preferred method in an RDO and/or RDO-like sense. The preferred method may then be signaled in the resulting data, for example, in the frame header, to allow a decoder to properly decode the frame. Here, for example, one such exemplary method may include the possible variation of a Direct Mode within B frames by either using a spatial prediction or a temporal prediction, or a Skip Mode motion vector selection within P frames by using either spatial predicted motion vector parameters or temporally predicted motion vector parameters, or even zero.

Applying Adaptive and/or Variable Deadzone Quantization to Data According to One or More Characteristics (Parameters):

In image data compression systems part of the data to be compressed, such as, for example, blocks or macroblocks, may actually include more significant information that when compared to other information (data) should be coded differently (e.g., at a higher priority, in a higher quality, etc.). One way to accomplish this is to use different quantizer values. For example, in certain implementations a smaller quantizer value may be used for "more important information" and a larger quantizer value may be used for the "less important information". However, doing so would also typically require the transmission of information identifying each quantizer value used for each block, macroblock, groups of macroblocks, etc., so that subsequent decompressing/decoding is successful. Unfortunately, such additional information tends to increase the compressed overhead and the complexity of the encoder. Thus, instead of increasing efficiency there may actually be a reduction in efficiency.

Attention is drawn to FIGS. 2(a–d), which are each illustrative graphs depicting certain exemplary Deadzone Quantizers employable within certain exemplary image/video coding schemes. In each of FIGS. 2a–d, the vertical (y-axis) represents quantized values and the horizontal (x-axis) represents original values. The illustrated exemplary Deadzone Quantizer 202 in FIG. 2(a), for example, is associated with a Deadzone Quantization A that can considerably improve coding efficiency versus a uniform quantizer. Conventional Deadzone Quantizers are often kept constant or uniform throughout the quantization process thus, possibly, not exploiting completely all existing redundancies within the data.

By considering or otherwise taking into account the importance of certain information within data and by adapting/modifying the Deadzone Quantizer at a block/macroblock basis, for example, an improvement in coding efficiency may be achieved. This can be done, for example, by adapting the coverage of each quantization bin (e.g., along the x-axis), but without changing the reconstructed value. For example, compare Deadzone Quantizer 202 to Deadzone Quantizers 204, 206 and 208 of FIGS. 2(b, c, and d), respectively. Here, the reconstructed values may remain constant throughout the coded data, unless of course a change in quantization parameters is signaled. For example, by increasing the zero bin (FIG. 2(c)) more data will be assigned to it, thus, depending on the compression scheme, achieving higher compression. There is obviously no need on the decoder to signal the change in the quantizer since the reconstructed values remain the same. Even though one could argue that such would impair the performance of the quantization, this is not necessarily always true if such processes are done selectively when certain condition(s) are satisfied, for example, if the compression is achieved using the new quantizer is considerably higher than the incurred distortion.

Figure 2A:
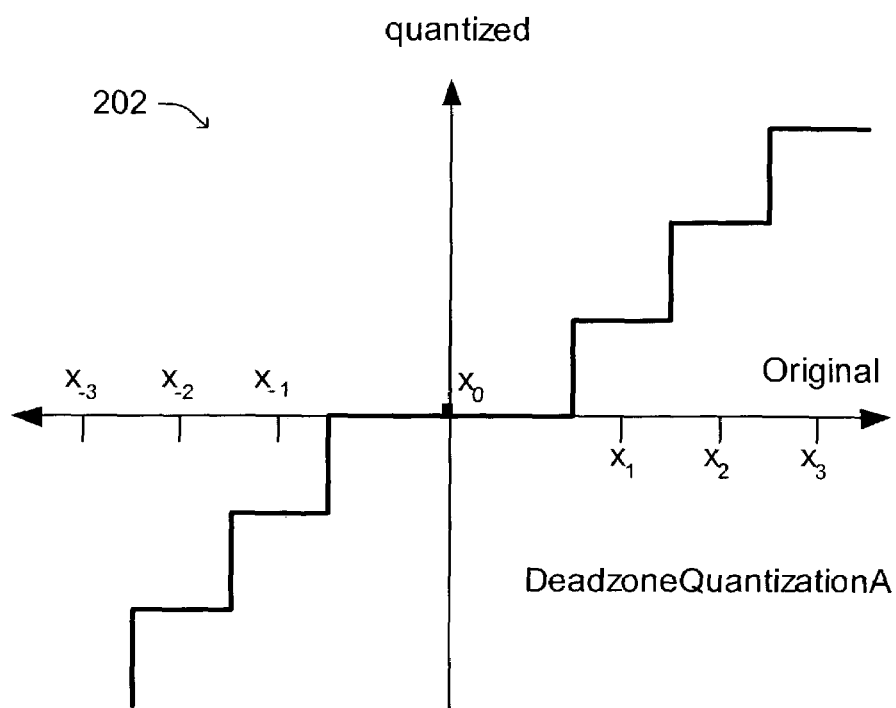
FIGS. 2(*a*–*d*) are graphs depicting exemplary selectable Deadzone Quantizers, in accordance with certain implementations of the present invention.
Figure 2B:
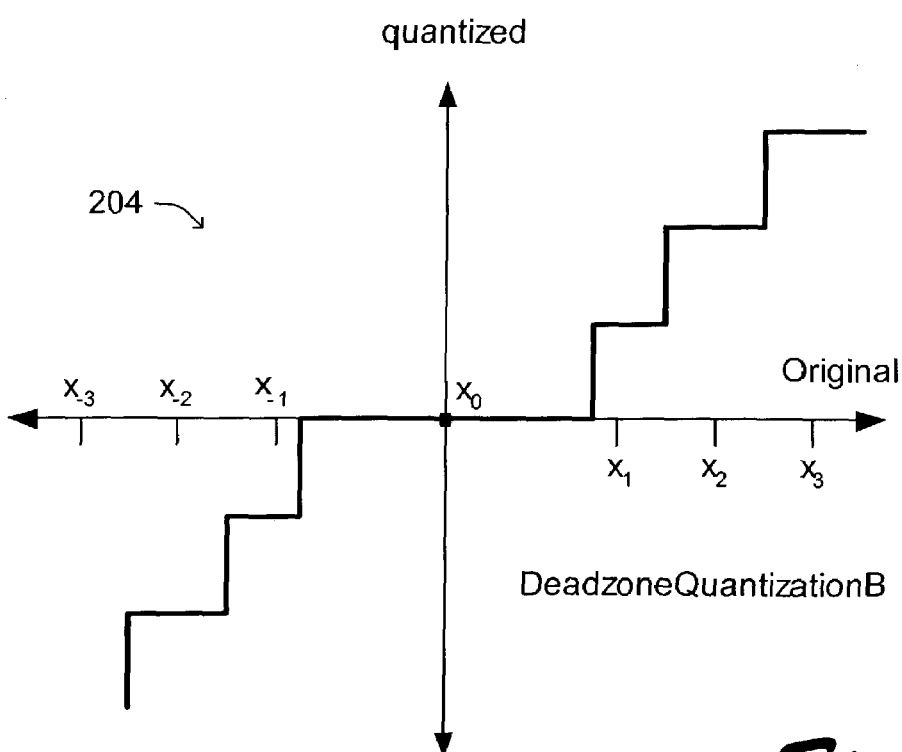
Figure 2C:
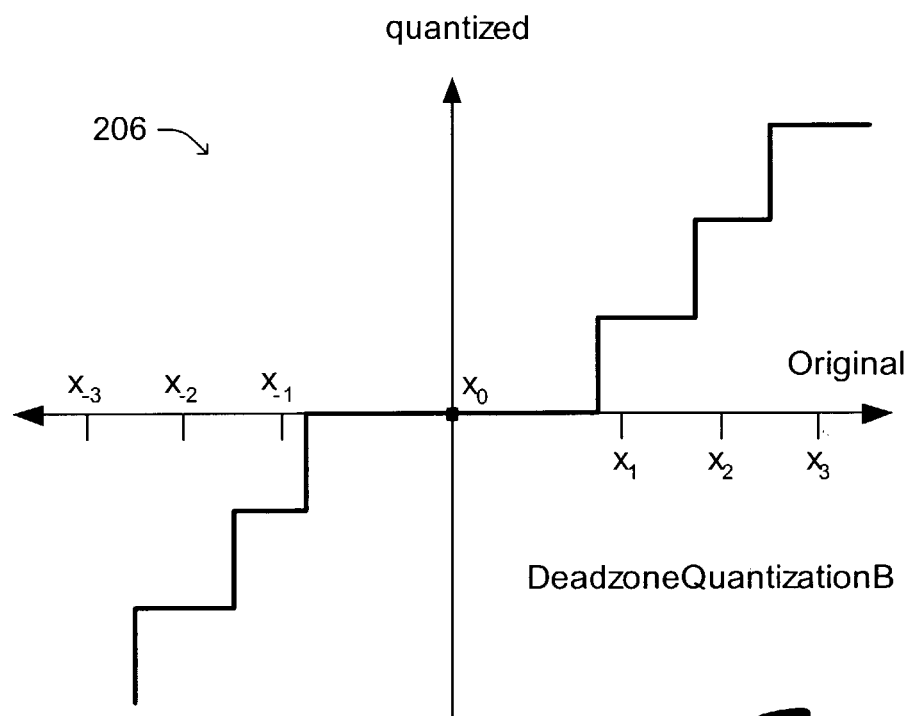
Figure 2D:
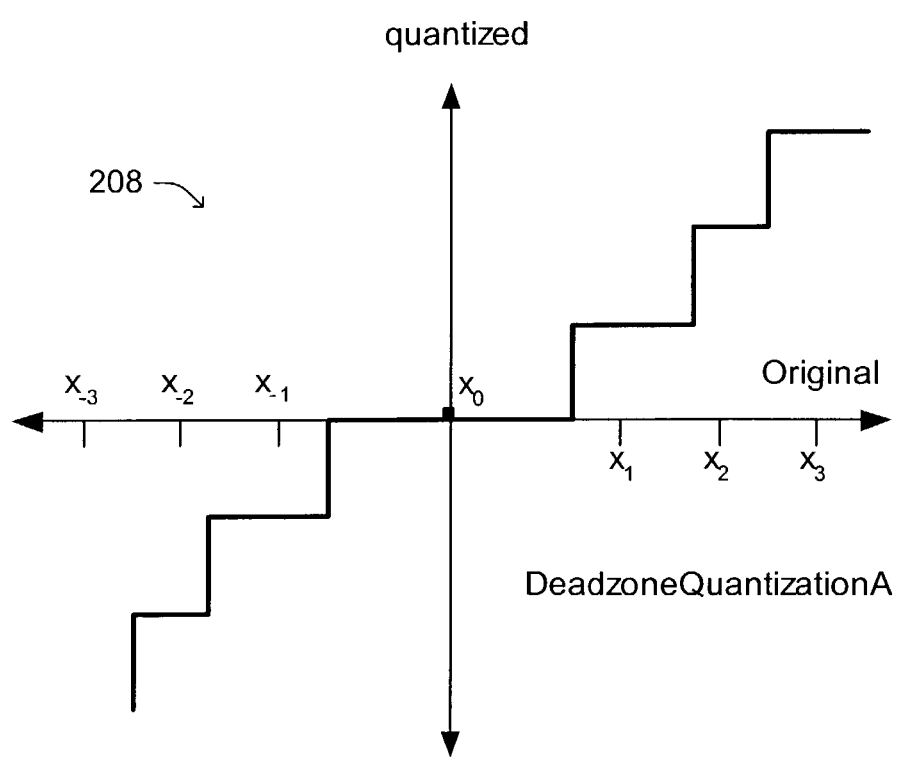

In FIG. 2(b), for example, the Deadzone quantizer only affects the zero bin versus the first positive/negative bins, where as all other bins remain the same and there is no change to the reconstructed value used. An adaptive scheme with adaptive estimate of the Deadzone is also possible (e.g., using Rate distortion optimization and adaptive estimate).

In accordance with certain exemplary implementations of the present invention, quatization selecting logic is therefore provided in the compressing/encoding system to select between different Deadzone Quantizers (or quantization values) based on at least one characteristic or parameter. For example, the logic may select between different Deadzone Quantizers 202, 204, 206 and 208 according to certain image characteristics.

More particularly, the logic may be configured to characterize texture and/or edges within the image data as representing "more important" information and therefore code such data in a manner to provide a higher level of quality. The logic can use conventional texture analysis/detection and edge detection algorithms to support such decision processes.

Figure 3:
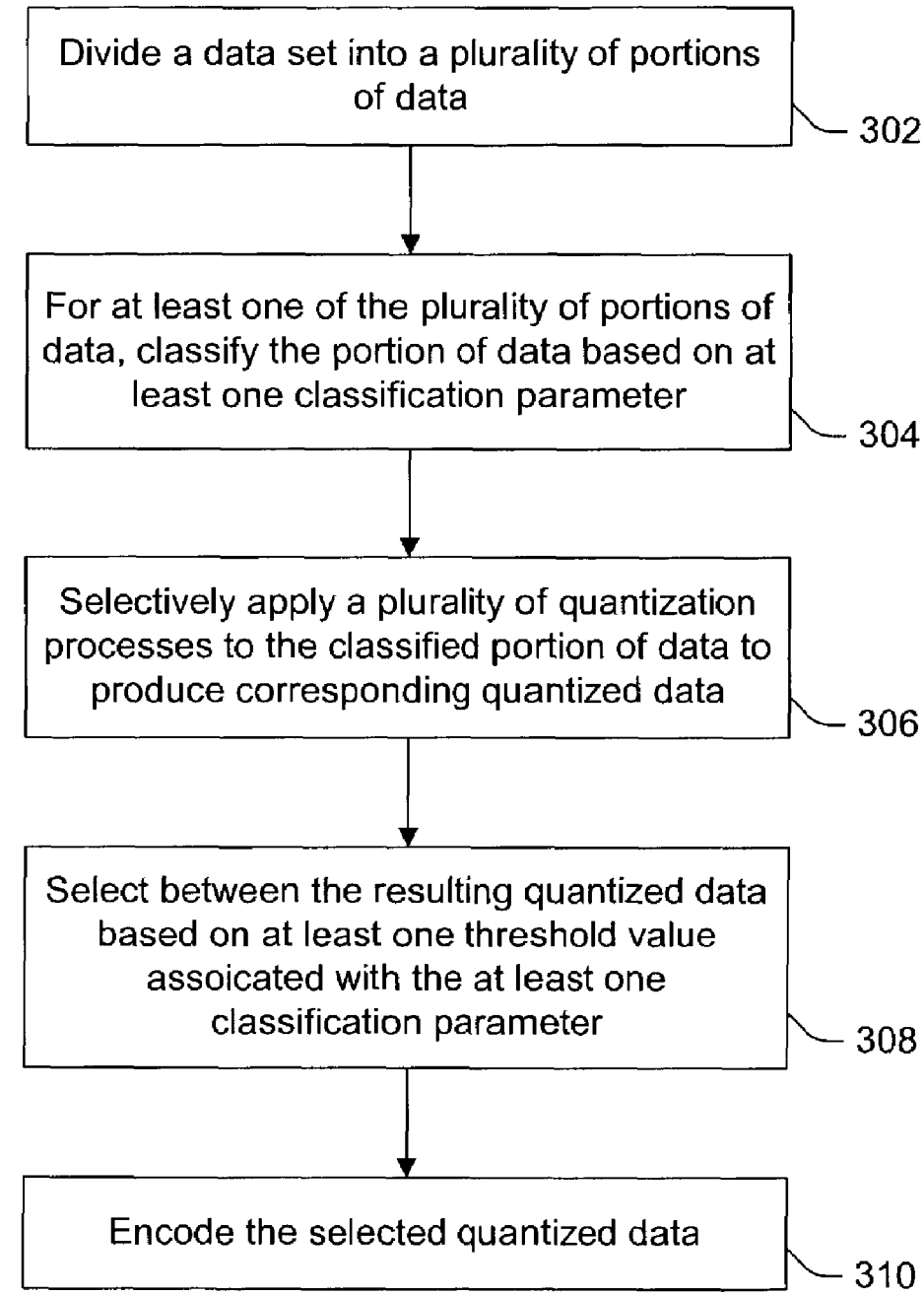
FIG. 3 is a flow diagram illustrating an exemplary method for selectively applying different quantization processes to data, in accordance with certain implementations of the present invention.

With this concept in mind, reference is now made to FIG. 3, which is a flow-diagram illustrating a method 300 for selectively applying different quantization processes to data, in accordance with certain implementations of the present invention. In act 302, an initial data set is divided into a plurality of portions of data. For example, image or video data may be divided into a plurality of blocks, macroblocks, slits, slice, sections, etc. In act 304, at least one of the plurality of portions of data from act 302 is classified in some manner, for example, based on at least one characteristic or parameter. For example, the classification may be based on edge characteristics, texture characteristics, smoothness characteristics, luminance characteristics, chrominance characteristics, color characteristics, noise characteristics, object characteristics, motion characteristics, user preference characteristics, user interface focus characteristics, layering characteristics, timing characteristics, volume characteristics, frequency characteristics, pitch characteristics, tone characteristics, quality characteristics, bit rate characteristics, data type characteristics, resolution characteristics, encryption characteristics.

In act 306, the classified portion from act 304 is processed using at least two of a plurality of quantization processes to produce corresponding quantized data. In act 308, a decision is made wherein one of the quantized data from act 306 is selected, for example, based on satisfying at least one threshold value or measurement that is associated with the classification parameter used in act 304. In act 310, the quantized data from act 308 is encoded in some manner that allows it to be subsequently decoded.

Using method 300, logic can be provided that essentially analyzes portions of image or video data and deems certain portions to be more important than others. Different Deadzone Quantizers are then applied to the more important data portions and the resulting quantized data analyzed to determine which Deadzone Quantizer(s) satisfy a desired threshold requirement for this more important data. For example, a quality or noise threshold requirement may be enforced.

By way of further example, in video sequences edges often play a significant role in motion compensation techniques. This is illustrated, for example, in the block diagram depicted in FIG. 7 that is described in greater detail below. Basically, it is possible to perform image analysis on an image (frame) or portion thereof, and according to the analysis decide which one of a plurality of Deadzone Quantizers is best to use to use, for example, according to Rate Distortion Optimization (RDO) criterion.

Figure 4:
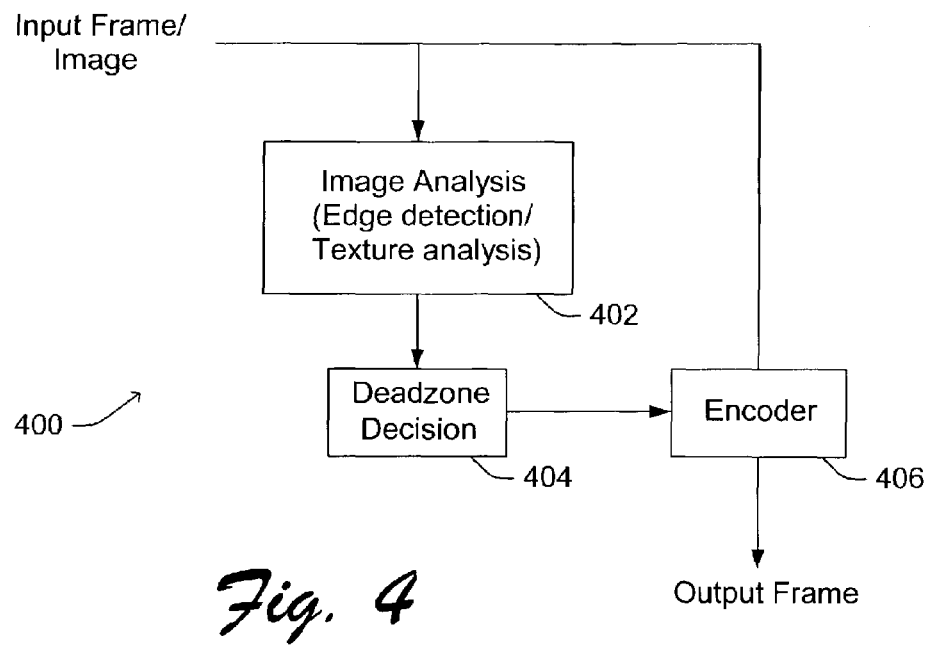
FIG. 4 is a block diagram depicting exemplary logic for selectively applying different quantization processes to data, in accordance with certain implementations of the present invention.

With reference to FIG. 4, logic 400 illustrates an on-the-fly decision process in accordance with certain exemplary implementations of the present invention. Here, an input frame/image (or portion thereof) is subjected to image analysis in block 402. In this example, the image analysis includes an edge detection and/or texture analysis capability and the output is provided to a Deadzone decision block 404. Deadzone decision block 404 then causes an encoder 406 to use a specified or otherwise selected Deadzone Quantizer or quantization value(s) when encoding the input frame/image (or portion thereof).

Figure 5:
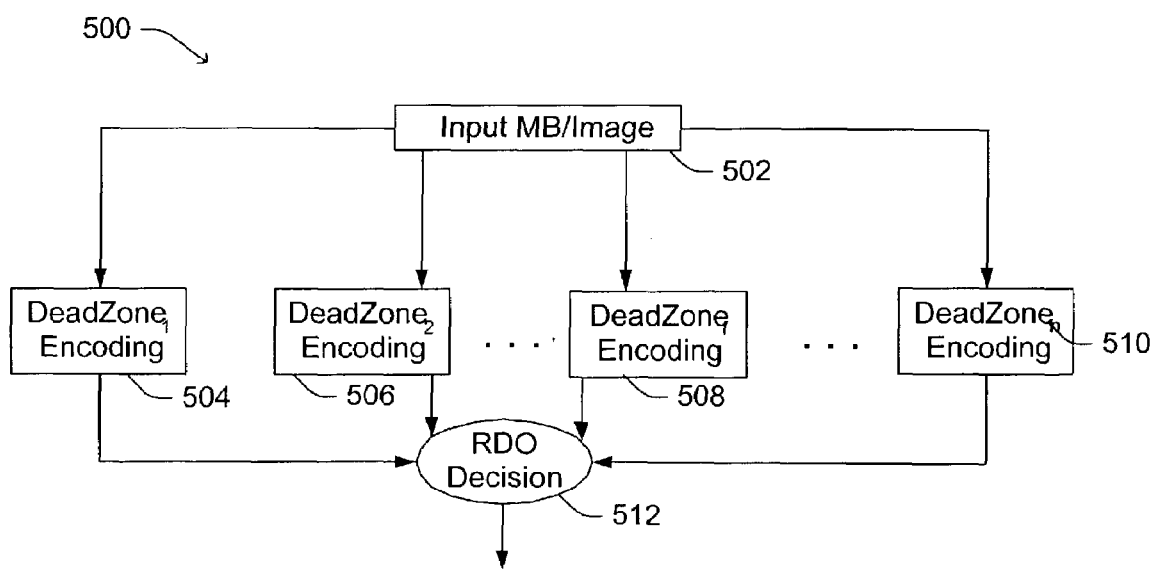
FIG. 5 is a block diagram depicting exemplary logic for selectively applying different quantization processes to data, in accordance with certain further implementations of the present invention.

Rather than making an on-the-fly decision regarding Deadzone Quantization, logic 500 in FIG. 5, is configurable to support method 300, wherein a plurality of Deadzone Quantizers are used and an RDO decision is made based on certain threshold criteria. Here, an input macroblock (MB)/image 502 (or other like portion) is (selectively) provided to different Deadzone encoding blocks 504, 506, 508, and/or 510, and the outputs from of these various Deadzone encoding blocks are analyzed in RDO decision block 512 and the selected encoded data output. As illustrated in this example, some or all of the Deadzone encoding blocks/processes may occur in parallel. In other implementations, such processes may be timed to occur serially.

Figure 6A:
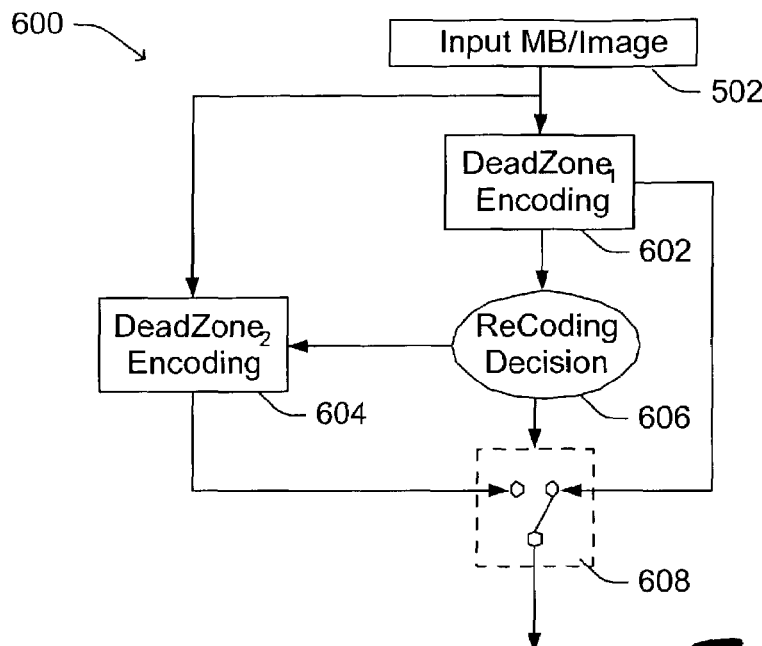
FIGS. 6(*a*–*b*) are block diagrams depicting exemplary logic for selectively applying different quantization processes to data, in accordance with still other implementations of the present invention.
Figure 6B:
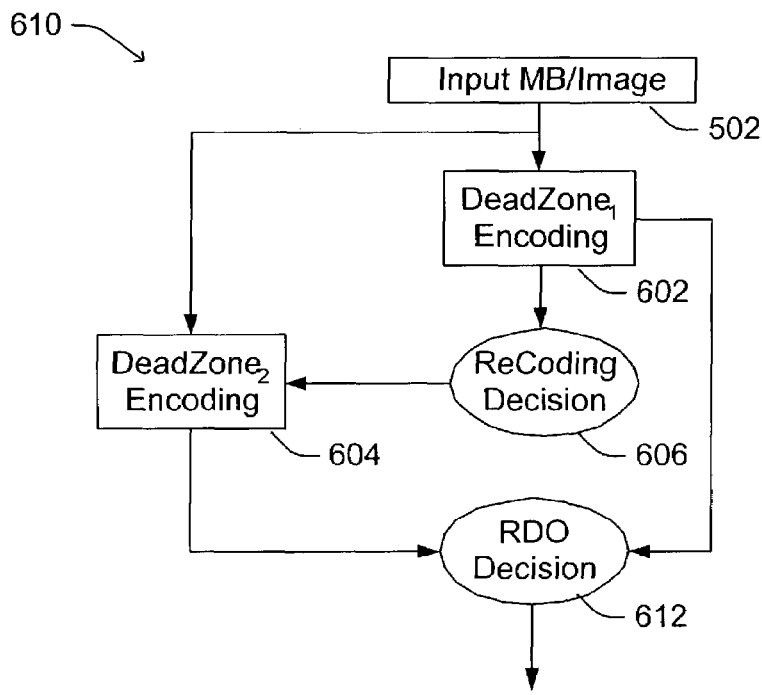

FIG. 6(a) and FIG. 6(b) illustrate logic wherein a selective recoding decision process is used. In FIG. 6(a), for example, input MB/image 502 is provided to Deadzone encoding blocks 602 and 604. A recoding decision block 606 considers the output from Deadzone encoding block 602 and affects the selection 608 between the outputs of Deadzone encoding blocks 602 and 604. Recoding decision block 606 may also selectively initiate Deadzone encoding block 604. In FIG. 6(b), logic 610 is similar to logic 600 but rather than having selection 608 associated with recoding decision block 606 includes an RDO decision block 612 that is configured to analyze the outputs from Deadzone encoding blocks 602 and 604 and decide which to output.

Recoding decision block 606 in FIGS. 6(a, b) may be configured to make decisions based on various criteria. For example, in certain implementations, quality limits, rate limits and/or other RDO concepts/thresholds may be considered.

It is also possible to use the additional Deadzone quantizers only if some previously defined conditions are satisfied, such as for example the rate/quality is above a particular threshold. In certain exemplary experiments, a Deadzone Quantizer was successfully selected which had about a 30% larger Deadzone than the original. Other, possibly adaptive according to image characteristics such as AC frequencies or edge types, Deadzone quantizers may also be used.

Figure 7:
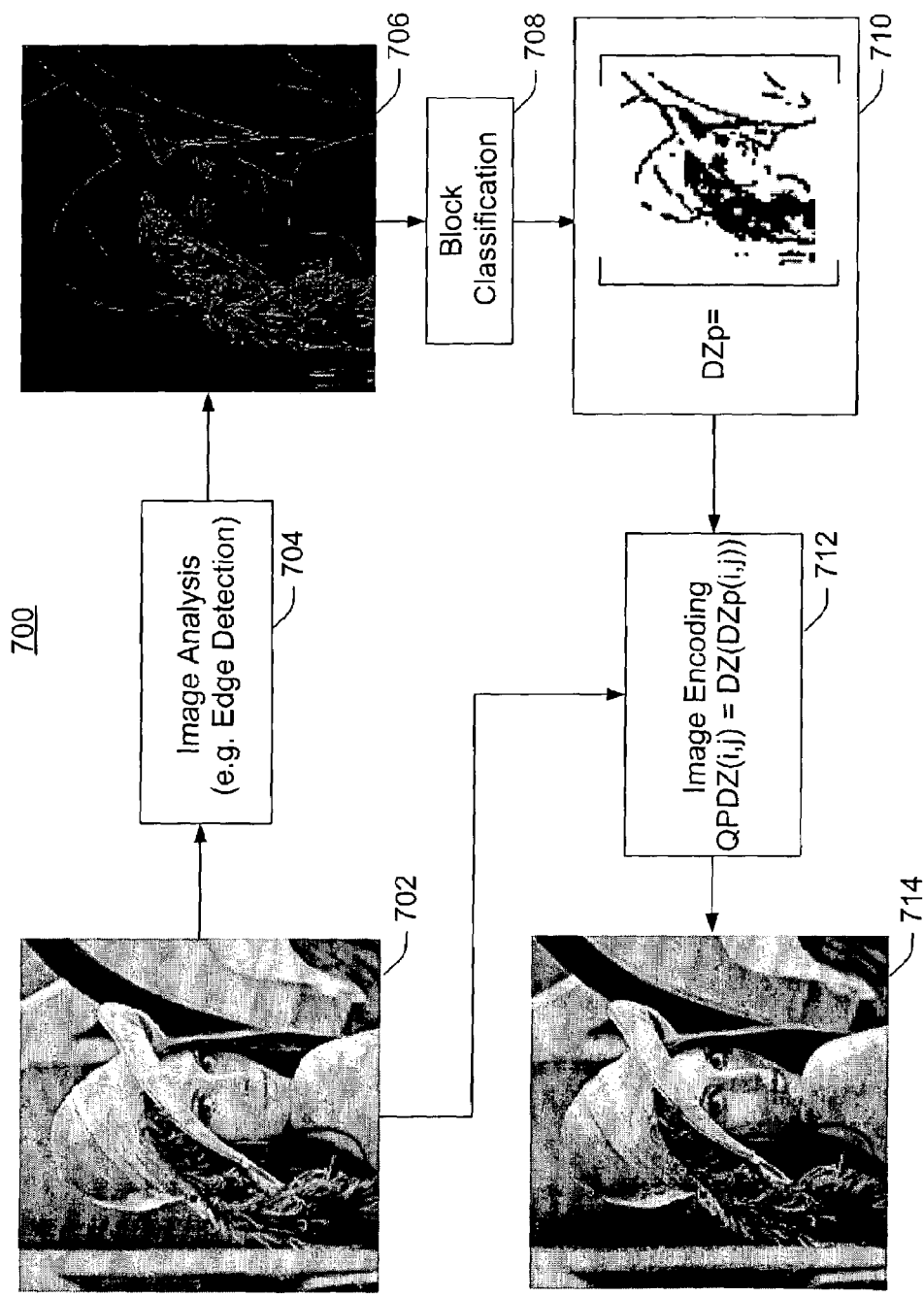
FIG. 7 is a block diagram illustratively depicting exemplary logic for selectively applying different quantization processes to image data, in accordance with certain implementations of the present invention.

In FIG. 7, exemplary encoding logic 700 illustratively demonstrates how an initial image 702 (or portion thereof) is processed according to an image analysis process 704 to produce, in this example, edge detection data 706. Edge detection data 706 is then provided to a block classification process 708 to produce block classified data 710. Block classified data 710 is then provided along with initial image 702 to an image encoding process 712, which then produces encoded image 714. This is one example, of a simple encoding process for an image. Here, the image is analyzed (e.g. using an edge detection algorithm) and then blocks are classified according to such information. Essentially a N-ary matrix ($DZ_p$) is defined (N depends on the number of Deadzones defined) which later on assigns the proper Deadzone (DZ) for the Quantizer (QP) assigned at Macroblock at position (i,j).

Consideration of Non Residual Modes (e.g., for B Frame Direct Mode):

Even though the above description might appear to be mainly focused on still images, the same concepts could be easily applied on video as well. For example, the image pre-analysis and the Deadzone quantizers can be used in a rather straightforward manner in video compression as well.

One case that appears quite interesting and can considerably benefit from the above concepts is the usage of Direct Mode within B frames. Direct Mode is basically a special mode which requires no transmission of motion parameters since such can be directly predicted through either spatial or temporal prediction. Additional information on Direct Mode can be found in co-pending U.S. Provisional Patent Application Ser. No. 60/385,965.

Figure 9:
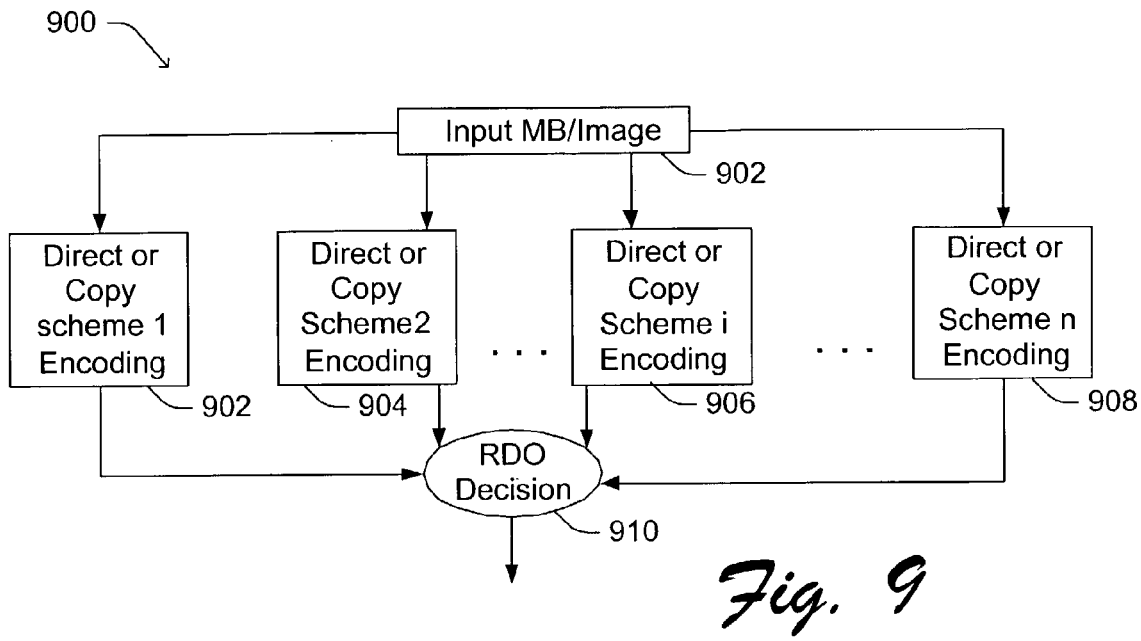
FIG. 9 is a block diagram depicting exemplary logic for selectively applying different encoding schemes to video data, in accordance with certain implementations of the present invention.

If there is no residue to be transmitted, efficiency can be improved further by the usage of a special mode, referred to herein as a Non Residual Direct Mode, in accordance with certain further aspects of the present invention. As described below, the Non Residual Direct Mode can be configured to exploit Run Length enCoding (RLC) strategies. Here, for example, if the distortion incurred is small enough and the reduction in bitrate due to the higher efficiency of the RLC is significant enough, then a Deadzone quantizer may provide a desirable solution. The basic idea is to selectively cause or otherwise force the Direct Mode, under certain conditions, to be coded without Residue even though such exists. Schemes based on the same concepts as in FIG. 5, for example, as shown in FIG. 9 may be implemented wherein the non residual direct mode is also examined within the RDO process compared to all other available modes. In certain instances, the performance of such scheme may not be as good as expected since the RDO used is inadequate for such cases. Other processes, which are dependent on the Quantization values, are also affected, such as, for example, an in-loop filter (not shown) that used to remove blocking artifacts. More specifically, even though performance appears to be good at lower bit rates, performance may suffer significantly at higher bit rates; it could be even outperformed by the usage of a larger quantizer and without the consideration of the Non Residual Direct Mode.

Similar to what was done in the images examples, in accordance with certain aspects of the present invention the logic can be configured to consider such modes only if some previously defined conditions are satisfied and in particular if the residue associated with the Direct Mode is not significant. The logic may, for example, be configured to use as a condition an estimate of how significant this residue is by examining the Coded Block Pattern (CBP) of the Direct Mode. If the CBP, without considering chrominance information, is below a particular threshold then this may be considered to imply that the residue is not as significant and if skipped it might not incur too much distortion. Further, other image characteristics such as the non existence of edges and texture may also be used within such video encoding processes/logic.

In certain implementations, the logic may even extend this even further by examining whether only the chrominance residue could be removed while keeping all luminance residue intact. It is also possible to extend such concepts to all possible modes for a macroblock that is to examine whether by sending no residue entirely, or no chrominance for this mode would give better performance. Obviously though such could increase the encoding complexity even further.

With regard to FIG. 9, logic 900 illustrates how an input MB/image 902 is provided to different Direct Mode (B frames) or Copy Mode (Inter frames) encoding process blocks 902, 904, 906, and 908 and the outputs from those process blocks provided to a frame based RDO decision block 910 that selects an appropriate output.

Figure 10:
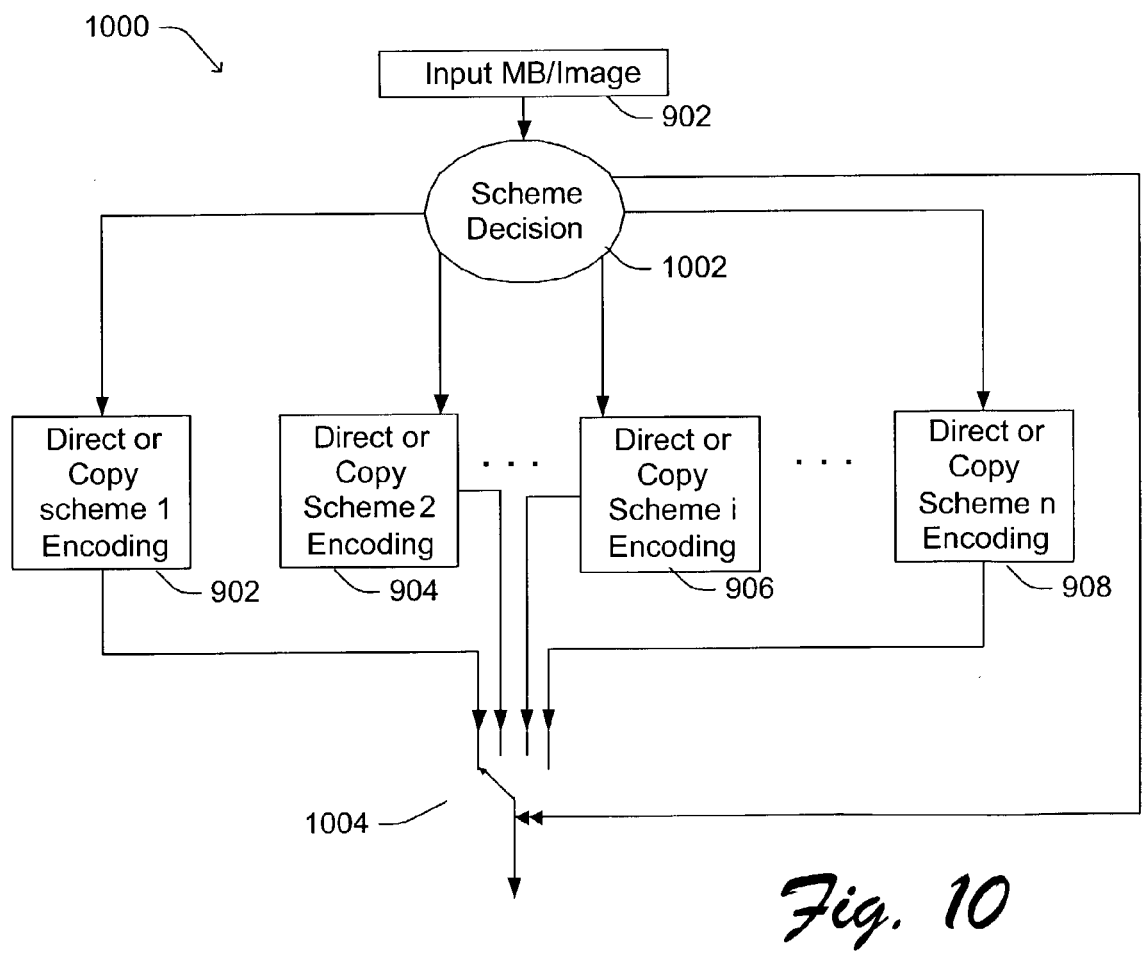
FIG. 10 is a block diagram depicting exemplary logic for selectively applying different encoding schemes to video data, in accordance with certain further implementations of the present invention.

With regard to FIG. 10, logic 1000 further illustrates how a scheme decision block 1002 and selection 1004 can also be included to provide additional selectability depending on user inputs, the application, system requirements, etc. Here, scheme decision block 1002 selectively provides input MB/image to one or more of the Direct Mode (B frames) or Copy Mode (Inter frames) encoding process blocks 902, 904, 906, and 908. Selection 1004 may be controlled by scheme decision block 1002 or other processes/logic/inputs.

Exemplary Use of Lagrangian Multiplier for B Frames:

RDO techniques are often based on the concepts of Langrangian Multipliers. For example, a specific mode may be selected that jointly minimizes distortion and bit rate.

Such a function can be expressed as the minimization of:

$$J(Mode|QP,\lambda)=SSD(Mode|QP)+\lambda \cdot R(Mode|QP)$$

where QP is the macroblock quantizer, $\lambda$ is the Lagrangian multiplier for mode decision, and Mode indicates the macroblock mode that is to be examined and possibly selected within the RDO process.

By way of example, in certain implementations, the Lagrangian multiplier $\lambda$ can be selected for Inter or Intra frames as:

$$\lambda_{I,P} = 0.85 \times 2^{\frac{QP}{3}}$$

or $$\lambda_{I,P} = 5 \times \frac{QP+5}{34-QP} \times \exp^{\frac{QP}{10}}$$

whereas in B frames, in most codecs such as JVT, this is selected as $\lambda_B = 4 \times \lambda_{I,P}$.

The additional weighting of $\lambda$ was done in order to give preference to lower overhead modes, since particularly for B frames, modes can have large overhead due to the multiple motion information transmitted, while the lower overhead modes, such as the Direct Mode, could still provide a very good, in terms of RDO, performance.

Based on certain experiments in accordance with the present invention, however, it has been found that the weighting should not be constant as described above, but instead it should be dependent again on the quantizer QP value.

In particular, if one defines $\lambda_B = f(QP) \times \lambda_{I,P}$, from these experiments it has been found that two $f(QP)$ functions that could be used with much better compression efficiency than the fixed $f(QP)=4$ case are:

$$f(QP) = \max\left(2, \min\left(4, \frac{QP}{6}\right)\right)$$

and $$f(QP) = \max\left(2, \min\left(4, \frac{QP+2}{8}\right)\right).$$

This observation also comes from the fact that by having a very high $\lambda$, one may also be affecting the accuracy of other important information, such as, for example, that of the motion prediction, which in consequence may have a negative impact to the encoding of the surrounding macroblocks.

Using Adaptive Type Selection of Prediction Dependent MB Modes:

As also described in co-pending U.S. Provisional Patent Application Ser. No. 60/385,965, co-pending U.S. Provisional Patent Application Ser. No. 60/376,005, and co-pending U.S. patent application Ser. No. 10/186,284, sequences and frames may have different types of dominant motion correlation.

In particular, for small objects with constant speed in a stationary background, the usage of motion vectors (MVs) from temporally adjacent frames (temporal domain) enable one to perform better prediction, and yield higher performance. Larger objects with smooth motion may instead have higher correlation in the spatial domain (adjacent macroblocks), whereas in other cases information from both spatial and temporal domain may be important for the prediction. These types of correlations are partly exploited, such as, for example within the Direct Mode in B and P frames and Skip on Motion Vector Predictor in P frames. For more information on Skip on Motion Vector Predictor in P frames see, e.g., Jani Lainema and Marta Karczewicz, "Skip mode motion compensation", document JVT-C027, JVT Meeting, Fairfax, May 2002. Thus, if the logic somehow signals which type of prediction is predominant at different frames, considerably higher performance can be achieved.

Hence, in accordance with certain aspects of the present invention, the encoding logic is configured to signal or otherwise identify in some manner at the frame, slice, or some other like level, which prediction scheme for prediction dependent modes is to be used. One exemplary syntax for accomplishing this, as an example within JVT, is presented in chart 800 in FIG. 8. Such syntax could, of course, be modified/different in other encoding designs.

With regard to the exemplary syntax in chart 800, three (3) possible prediction cases are allowed for the P frame skip mode. In this example, there is a Motion-Copy prediction mode, a temporal prediction skip mode and the zero skip mode. Each one of these cases is assigned a value between {0, 1, 2}, which can be coded using either a fixed size codeword, in this example u(2)=2 bits, or is even entropy coded (e.g., e(v) using UVLC or CABAC). Those skilled in the art will recognize other ways of conveying such information that may also be employed. In chart 800, which illustrates Picture Layer RBSP Syntax within JVT with the addition of Adaptive Spatial/Spatio-temporal consideration for B Frames (direct_mv_spatial) and Adaptive Copy/Motion-Copy Skip mode in Inter frames (copy_mv_spatial). If only these two modes are used, then the defined descriptors may take only 1 bit, thus u(n=1), but if more cases are to be used (spatial prediction with zero bias or consideration of stationary temporal prediction) then more bits could be assigned (n>1) or even use entropy coding for this parameter defined by e(v).

For B frames, in this example, Spatial motion vector prediction may be used for all Direct Mode motion parameters as one mode, and the temporally predicted parameters as a second mode. Other direct modes as described, for example, in co-pending U.S. Provisional Patent Application Ser. No. 60/385,965 may also be considered/included. The encoding logic is configured to signal which prediction mode is to be used at the Frame or slice level. The selection can be performed, for example, using an RDO based scheme (e.g., FIG. 9). In certain implementations, the encoding logic may also make use a specific mode explicitly due to specific requirements placed on the encoder and/or decoder. In one particular example, considering that the Spatial Prediction is usually computationally simpler (e.g., requiring no division, no storage of the motion vectors, and is independent to timing information), it may be the preferred choice for some applications (e.g., FIG. 10).

In others implementations, where such problems are not an issue, the combination may yield further improved encoding performance. One example of an encoded sequence is shown in the illustrative diagram of FIG. 11. Here, P and B frames are shown along with a scene change. As illustrated by the arrows differently signaled P and B frames are shown for corresponding Skip, or Direct mode macroblocks. Note also that the signaling can be an indication of how the encoding logic should perform the motion vector prediction for the motion vector coding, or for the prediction of other modes (e.g., Direct P described in co-pending U.S. Provisional Patent Application Ser. No. 60/376,005 and co-pending U.S. patent application Ser. No. 10/186,284).

Figure 11:
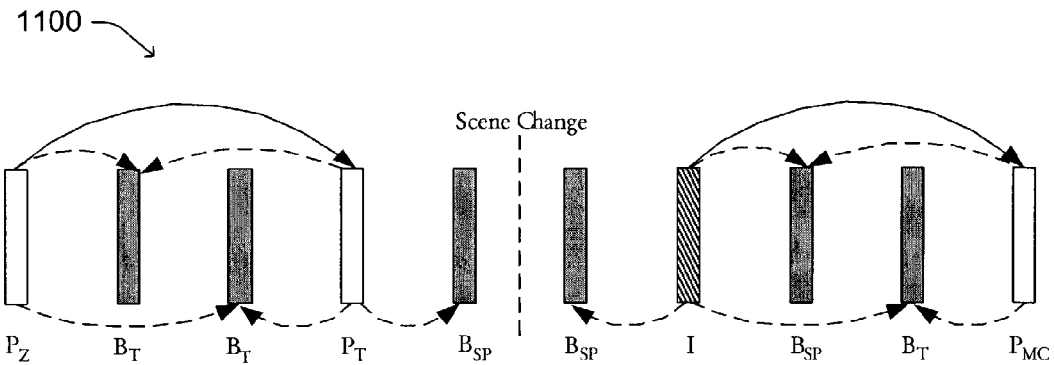
FIG. 11 is an illustrative diagram depicting certain features of a video sequence employing selectively applied encoding schemes, in accordance with certain implementations of the present invention.

As shown in FIG. 11, different frames signal different type of prediction for their corresponding Direct (B) and Skip (P) modes. $P_Z$, $P_T$, and $P_M$ define for example zero, temporal and spatial (Motion-Copy) prediction, and $B_T$ and $B_{SP}$ define temporal and spatial prediction for Direct mode.

Time Stamp Independent Direct Mode, with the Consideration of Stationary Temporal/Spatial Blocks:

Different types of prediction, especially for the Direct Mode in B frames, may be more appropriate for different types of motion and sequences. Using temporal or spatial prediction only, may in some cases provide acceptable performance, but in others performance might be considerably worse. A solution as was described the preceding section, or for the cases presented in co-pending U.S. Provisional Patent Application Ser. No. 60/385,965 may provide even better performance.

By way of example, one additional case is presented which appears to be quite efficient and that combines the performance of both temporal and spatial predictors, while tending to keep the spatial predictor simple by not requiring division, and/or which is timing independent.

In certain implementations, spatial prediction may be more useful (e.g., due to its properties) than temporal prediction. Thus, for example, spatial prediction is used as the main prediction of Direct Modes. One possible exception is made when the motion information and the reference frame from the temporal predictors are zero. In such a case, the motion information and reference frame for the corresponding block of the direct mode is also considered to be zero. Furthermore, the spatial prediction is refined by also considering a spatial zero biased-ness and/or of stationary subpartitions. Accordingly, if any or some of the adjacent macroblocks or blocks to the currently predicted block have zero motion (or very close (e.g. integer motion vector is zero) and reference frame, then also the entire macroblock, or part of it is also considered to have zero motion. Both of these concepts help in protecting stationary backgrounds, which, in particular at the edges of moving objects, might be quite distorted if such conditions are not introduced.

Figure 12:
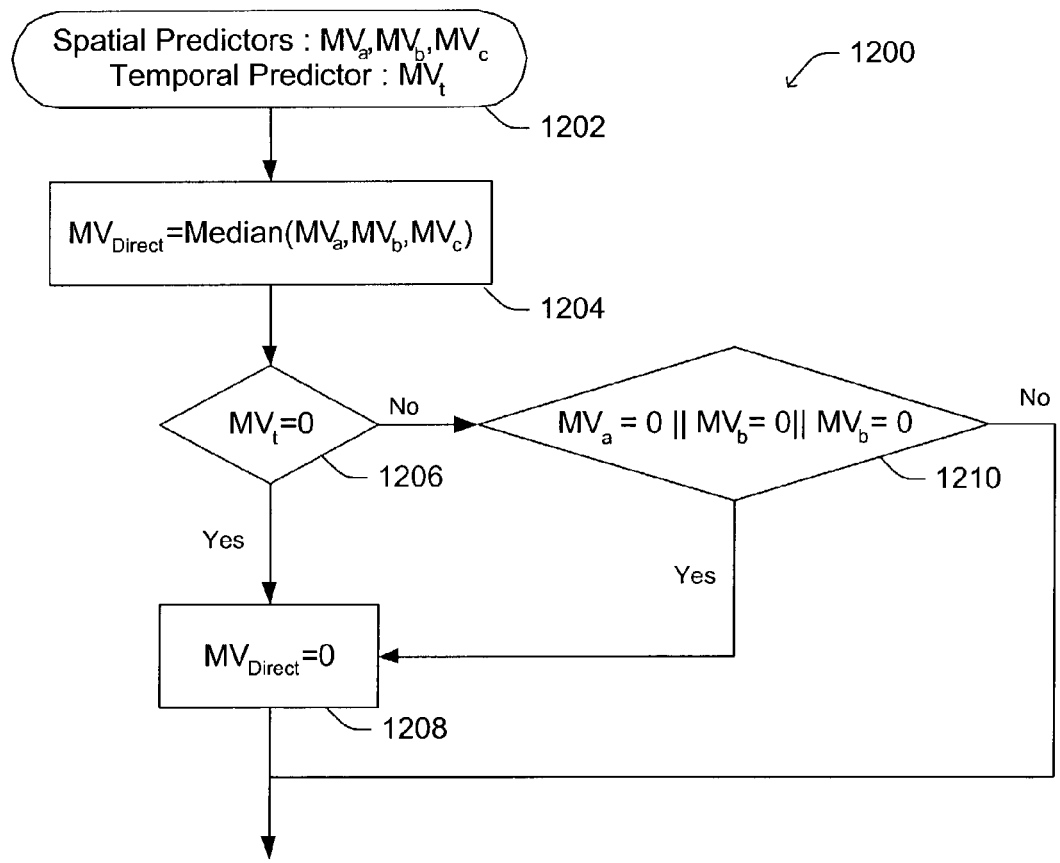
FIG. 12 is a flow diagram depicting an exemplary method for Spatio-Temporal Prediction for Direct Mode video sequences, in accordance with certain implementations of the present invention.

A flow diagram 1200, simplified for the case of a 16×16 Macroblock, is shown in FIG. 12. It is noted that such concepts using spatial prediction for the direct mode, may also be extended to even smaller blocks (e.g. 8×8 or 4×4) (or larger blocks or other shaped portions). In act 1202, spatial predictors $MV_a$, $MV_b$, and $MV_c$ and temporal predictor $MV_t$ are provided to act 1204, wherein $MV_{Direct}$ is set to a Median ($MV_a$, $MV_b$, $MV_c$). In act 1206 a decision is made based on $MV_t$ that leads to either act 1208 wherein $MV_{Direct}$ is set to zero, or act 1210 for an additional decision. As result of act 1210, $MV_{Direct}$ is either set to zero in act 1208 or not changed, and $MV_{Direct}$ is output.

In this description, several concepts related to Rate Distortion Optimization for the encoding of images, video sequences, or other types of data have been presented. Additional syntax has been demonstrated that may be adopted within video sequences that enables considerably higher compression efficiency by allowing several alternative prediction cases, especially for cases such as the Skip and Direct Mode within P and B frames respectively, which may be signaled at the beginning of the image. A high efficiency time stamp independent Direct Mode for B frames has been presented which considers spatial motion vector prediction as well with stationary temporal predictors. All or part of the above methods and apparatuses can be implemented to significantly improve the performance of various image/video/data coding systems.

Although some preferred implementations of the various methods and apparatuses of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention.

What is claimed is:

1. A method for encoding video, the method comprising:
   making a decision between temporal motion vector prediction and spatial motion vector prediction for a slice of a B-picture in a video sequence; and
   signaling slice-level syntax information indicating the decision for the slice, wherein the signaling facilitates selectively applying spatial prediction of motion associated with the slice of the B-picture in the video sequence, and wherein selectively applying spatial prediction comprises:

at a decoder, using temporal prediction of motion associated with the slice if the slice-level syntax information indicates temporal motion vector prediction for the slice; and at the decoder, using spatial prediction of motion associated with the slice if the slice-level syntax information indicates spatial motion vector prediction for the slice, wherein spatially predicted motion for a current portion of the slice is based on motion vector information for plural neighboring portions, and wherein the spatial prediction includes setting the spatially predicted motion for the current portion to be zero when the motion vector information for each of the plural neighboring portions includes plural motion vector components set to zero.

2. The method of claim 1 wherein the slice of the B-picture comprises plural macroblocks.

3. The method of claim 2 wherein the plural macroblocks are direct mode macroblocks.

4. The method of claim 1 wherein the slice of the B-picture comprises plural 16×16 macroblocks.

5. The method of claim 4 wherein the plural 16×16 macroblocks are direct mode macroblocks.

6. The method of claim 5 wherein the plural 16×16 direct mode macroblocks include four 8×8 sub-blocks.

7. The method of claim 1 wherein the motion vector information for plural neighboring portions includes luminance motion vector information.

8. The method of claim 1 wherein spatially predicted motion for a second portion of the slice is based on motion vector information for plural neighboring portions, and wherein the spatial prediction for the second portion includes median prediction based on the motion vector information for the plural neighboring portions.

9. A method for decoding video, the method comprising:
receiving slice-level syntax information indicating a decision between temporal motion vector prediction and spatial motion vector prediction for a slice of a B-picture in a video sequence, wherein the slice-level syntax information facilitates selectively applying spatial prediction of motion associated with the slice of the B-picture in the video sequence;

using temporal prediction of motion associated with the slice if the slice-level syntax information indicates temporal motion vector prediction for the slice; and using spatial prediction of motion associated with the slice if the slice-level syntax information indicates spatial motion vector prediction for the slice, wherein spatially predicted motion for a current portion of the slice is based on motion vector information for plural neighboring portions, and wherein the spatial prediction includes setting the spatially predicted motion for the current portion to be zero when the motion vector information for each of the plural neighboring portions includes plural motion vector components set to zero.

10. The method of claim 9 wherein the slice of the B-picture comprises plural macroblocks.

11. The method of claim 10 wherein the plural macroblocks are direct mode macroblocks.

12. The method of claim 9 wherein the slice of the B-picture comprises plural 16×16 macroblocks.

13. The method of claim 12 wherein the plural 16×16 macroblocks are direct mode macroblocks.

14. The method of claim 13 wherein the plural 16×16 direct mode macroblocks include four 8×8 sub-blocks.

15. The method of claim 9 wherein the motion vector information for plural neighboring portions includes luminance motion vector information.

16. The method of claim 9 wherein spatially predicted motion for a second portion of the slice is based on motion vector information for plural neighboring portions, and wherein the spatial prediction for the second portion includes median prediction based on the motion vector information for the plural neighboring portions.

17. One or more computer-readable media having stored thereon computer-executable instructions for causing one or more computers to perform a method for encoding video, the method comprising:
making a decision between temporal motion vector prediction and spatial motion vector prediction for a slice of a B-picture in a video sequence; and signaling slice-level syntax information indicating the decision for the slice, wherein the signaling facilitates selectively applying spatial prediction of motion associated with the slice of the B-picture in the a video sequence, and wherein selectively applying spatial prediction comprises:
at a decoder, using temporal prediction of motion associated with the slice if the slice-level syntax information indicates temporal motion vector prediction for the slice; and at the decoder, using spatial prediction of motion associated with the slice if the slice-level syntax information indicates spatial motion vector prediction for the slice, wherein spatially predicted motion for a current portion of the slice is based on motion vector information for plural neighboring portions, and wherein the spatial prediction includes setting the spatially predicted motion for the current portion to be zero when the motion vector information for each of the plural neighboring portions includes plural motion vector components set to zero.

18. The computer-readable media of claim 17 wherein the slice of the B-picture comprises plural macroblocks.

19. The computer-readable media of claim 18 wherein the plural macroblocks are direct mode macroblocks.

20. The computer-readable media of claim 17 wherein the slice of the B-picture comprises plural 16×16 macroblocks.

21. The computer-readable media of claim 20 wherein the plural 16×16 macroblocks are direct mode macroblocks.

22. The computer-readable media of claim 21 wherein the plural 16×16 direct mode macroblocks include four 8×8 sub-blocks.

23. The computer-readable media of claim 17 wherein the motion vector. information for plural neighboring portions includes luminance motion vector information.

24. The computer-readable media of claim 17 wherein spatially predicted motion for a second portion of the slice is based on motion vector information for plural neighboring portions, and wherein the spatial prediction for the second portion includes median prediction based on the motion vector information for the plural neighboring portions.

25. One or more computer-readable media having stored thereon computer-executable instructions for causing one or more computers to perform a method for decoding video, the method comprising:
receiving slice-level syntax information indicating a decision between temporal motion vector prediction and spatial motion vector prediction for a slice of a B-picture in a video sequence, wherein the slice-level syntax information facilitates selectively applying spatial prediction of motion associated with the slice of the B-picture in the video sequence;

using temporal prediction of motion associated with the slice if the slice-level syntax information indicates temporal motion vector prediction for the slice; and using spatial prediction of motion associated with the slice if the slice-level syntax information indicates spatial motion vector prediction for the slice, wherein spatially predicted motion for a current portion of the slice is based on motion vector information for plural neighboring portions, and wherein the spatial prediction includes setting the spatially predicted motion for the current portion to be zero when the motion vector information for each of the plural neighboring portions includes plural motion vector components set to zero.

26. The computer-readable media of claim 25 wherein the slice of the B-picture comprises plural macroblocks.

27. The computer-readable media of claim 26 wherein the plural macroblocks are direct mode macroblocks.

28. The computer-readable media of claim 25 wherein the slice of the B-picture comprises plural 16×16 macroblocks.

29. The computer-readable media of claim 28 wherein the plural 16×16 macroblocks are direct mode macroblocks.

30. The computer-readable media of claim 29 wherein the plural 16×16 direct mode macroblocks include four 8×8 sub-blocks.

31. The computer-readable media of claim 25 wherein the motion vector information for plural neighboring portions includes luminance motion vector information.

32. The computer-readable media of claim 25 wherein spatially predicted motion for a second portion of the slice is based on motion vector information for plural neighboring portions, and wherein the spatial prediction for the second portion includes median prediction based on the motion vector information for the plural neighboring portions.

* * * * *